United States Patent [19]

Seddon

[11] 4,398,624

[45] Aug. 16, 1983

[54] OVERHEAD ELECTRIC TRACTION SYSTEMS

[75] Inventor: Alan E. Seddon, Rainford, England

[73] Assignee: BICC Public Limited Company, London, England

[21] Appl. No.: 227,716

[22] Filed: Jan. 23, 1981

[30] Foreign Application Priority Data

Jan. 28, 1980 [GB] United Kingdom ............... 8002752

[51] Int. Cl.³ ............................................. B60M 1/22
[52] U.S. Cl. .................................... 191/40; 174/45 R
[58] Field of Search ................. 174/45 R, 41, 45 TD; 191/40, 41, 33 R

[56] References Cited

U.S. PATENT DOCUMENTS

| | | | |
|---|---|---|---|
| 1,616,931 | 2/1927 | Thomas | 174/45 R |
| 1,756,316 | 4/1930 | Viele | 191/41 |
| 3,159,709 | 12/1964 | Austin | 174/45 R |
| 3,316,342 | 4/1967 | Cofer | 174/45 R |
| 3,504,464 | 4/1970 | Bair | 174/45 R |

Primary Examiner—Richard A. Schacher

Attorney, Agent, or Firm—Buell, Blenko, Ziesenheim & Beck

[57] ABSTRACT

The invention concerns an overhead electric traction system of the kind in which current is collected from an overhead contact wire by means of a collector carried on the roof of a vehicle and extending transversely of the contact wire. The contact wire is supported, at spaced positions along the route of the system, by an overhead structure comprising two transversely spaced upstanding members, and extending between and connected to the upstanding members, a transversely extending beam. Each of the upstanding members is so installed near its lowermost end as to permit limited pivotal movement of the member at least about an axis extending lengthwise of the route of the system and limited relative movement is permitted between the beam and the upstanding member at least about an axis extending lengthwise of the route of the system, each upstanding member being anchored to the ground by at least one tie connected to the member near its uppermost end.

17 Claims, 5 Drawing Figures

OVERHEAD ELECTRIC TRACTION SYSTEMS

This invention relates to overhead electric traction systems of the kind in which current is collected from an overhead contact wire by means of a collector comprising a shoe or bar extending transversely of the contact wire, which collector, in its operative position, is pressed upwards into contact with the underside of the contact wire, usually, but not in all cases, by a spring-loaded pantograph mechanism on which the collector is supported and which is mounted on the roof of a vehicle. The invention is concerned both with overhead electric traction systems of this kind in which a vehicle or vehicles travel along a permanent track or permanent tracks, such as a railway or tramway system, and with overhead electric traction systems of this kind in which a vehicle or vehicles travel along a road or other carriageway without the restraint of a permanent track, such as a trolley-bus system.

It is an object of the present invention to provide, in an overhead electric traction system of the aforesaid kind, an overhead structure for supporting a contact wire or contact wires, which overhead support structure is lighter and simpler in construction is easier to install and maintain, and is therefore substantially less expensive than comparable overhead support structures of known form.

According to the invention we provide an improved overhead electric traction system in which, at at least one of a plurality of positions spaced along the route of the system, the contact wire or wires is or are supported by an overhead structure comprising two transversely spaced upstanding members and, extending between and connected to said upstanding members, a transversely extending beam, wherein each of the upstanding members is so installed at or near its lowermost end as to permit limited pivotal movement of the member at least about an axis extending lengthwise of the route of the system; each end of the transversely extending beam is so connected to one of the upstanding members at or near the uppermost end of the member and/or the beam is of such construction as to permit limited relative movement between the beam and the upstanding member at least about an axis extending lengthwise of the route of the system; and each upstanding member is anchored directly or indirectly to the ground by at least one tie connected to the member at or near its uppermost end.

Preferably, each upstanding member is so installed at or near its lowermost end as to permit limited pivotal movement in any direction; each end of the transversely extending beam is so connected to one of the upstanding members at or near the uppermost end of the member and/or the beam is of such a construction as to permit limited relative movement between the beam and the upstanding member in any direction; and each upstanding member is anchored directly or indirectly to the ground by at least two spaced ties connected to the member at or near its uppermost end.

In a preferred embodiment, pivotal movement in any direction of each upstanding member at or near its lowermost end is provided by means of a ball and socket coupling at the lowermost end of the member. The lowermost end of the member may be of substantially hemi-spherical shape and may engage in a recess of substantially hemi-spherical shape provided in a fitting mounted on or in the ground or the lowermost end of the member may have a recess of substantially hemi-spherical shape which engages over an upstanding boss of substantially hemi-spherical shape carried by a fitting mounted on or in the ground.

Each upstanding member may be a pole, a column, a lattice work girder or other fabricated structural member.

The or each tie may be a substantially rigid elongate element, eg, a strut, or it may be a flexible stranded cable of wires of metal or metal alloy or of filaments of glass fibre or other inorganic material, a single wire or other suitable flexible elongate element.

In all cases, the transversely extending beam may be a substantially rigid elongate member or a substantially rigid lattice girder or other elongate structure, or it may be a tensioned wire beam substantially as described in the specification of our co-pending patent application Ser. No. 227,714 filed on the same day as the present application and comprising at least two flexible elongate elements positioned one above and spaced from the other and, securing the flexible elements together, a plurality of substantially vertically disposed compression and/or tension elements attached to the flexible elements at spaced positions along their lengths, the flexible elements being so secured to said transversely spaced upstanding members that the flexible elements are in tension.

Depending on the width of the span to be bridged by the overhead support structure and/or the weight of the contact wire or wires and the ancillary equipment, the substantially vertically disposed elements attached to the transversely extending flexible elements at spaced positions along their lengths may all be substantially rigid compression or tension members or may all be flexible tension elements but, for extra wide spans, the tensioned wire beam of the overhead support structure may be of compound form in which, over an intermediate part of the lengths of the transversely extending flexible elements, the substantially vertically disposed elements are substantially rigid compression members and over end parts of the lengths of the flexible elements, the substantially vertically disposed elements are flexible or substantially rigid tension elements.

Each transversely extending flexible elongate element is preferably a plurality of wires of high tensile steel or other metal or metal alloy stranded together but, in some circumstances, each flexible elongate element may be a plurality of filaments of glass fibre or other inorganic material stranded together.

Where some or all of the substantially vertically disposed elements of the beam are substantially rigid compression or tension members, each is preferably a substantially rigid rod or tube of resin bonded glass fibre or other resin bonded fibrous inorganic material but it may be a rod, tube or other elongate member of metal or metal alloy, or of glass, ceramic or other electrically insulating material. Where some or all of the substantially vertically disposed elements of the beam are flexible tension elements, each is preferably a plurality of wires of high tensile steel or other metal or metal alloy stranded together or a plurality of filaments of glass fibre or other inorganic material stranded together.

In all cases, preferably the substantially vertically disposed elements of the beam are so attached to the transversely extending flexible elongate elements that substantial movement of a vertically disposed element along a flexible elongate element is prevented.

The contact wire or contact wires and, where present the associated catenary wire or wires, may be suspended from or supported by an overhead support structure of the present invention in any convenient manner and, in some circumstances, steady arms of known form may be employed. For reasons of simplicity and economy, however, where the transversely extending beam is a tensioned wire beam and some or all of the substantially vertically disposed elements of the beam are substantially rigid compression or tension members, preferably the or each contact wire is suspended from the lowermost end of a vertically disposed substantially rigid compression or tension member of resin bonded glass fibre or other electrically insulating material and the or each catenary wire is supported on the uppermost end of such a compression or tension member. For these purposes, preferably the or each compression or tension member by which a contact wire and/or catenary wire is or are to be supported protrudes downwardly below and/or upwardly above the transversely extending flexible elongate elements to which it is attached.

In all cases where the beam includes substantially vertically disposed substantially rigid compression or tension members attached to the transversely extending flexible elongate elements, preferably each compression or tension member has spaced from both its ends, holes through which the flexible elongate elements pass; preferably, also, the compression members are clamped to the flexible elongate elements by wedges driven into the holes or by other means. Alternatively, each compression or tension member may be secured to the flexible elongate elements by U-bolts, J-bolts or by any other suitable means.

The overhead support structure of the present invention has the important advantage that, since each upstanding member is so installed at or near its lowermost end as to permit limited pivotal movement of the member, the work involved in preparing, and the depth of, a foundation for the member, and hence the expense incurred, are substantially less than is the case with a conventional substantially rigid upstanding member. Upstanding members that are so installed as to permit limited pivotal movement of the members, are especially suitable for use on sites where construction of a deep foundation for a member is difficult or impossible.

The invention is further illustrated by a description, by way of example, of three forms of overhead support structure for use in an overhead electric traction system, with reference to the accompanying drawings, in which.

Figure 1:
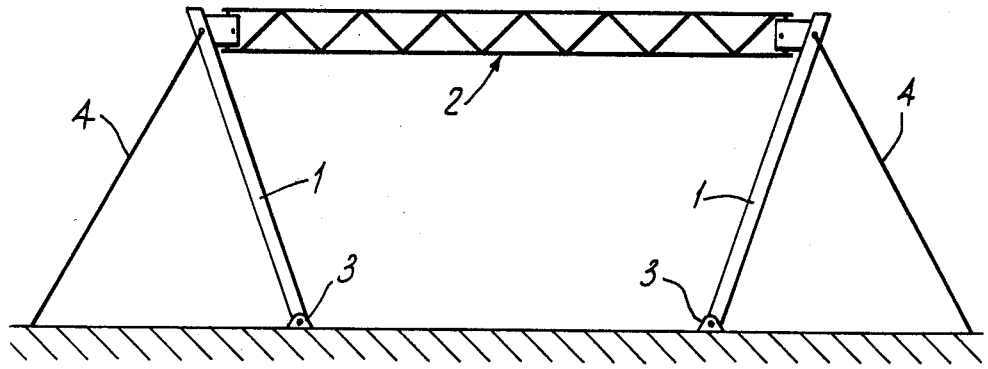
FIG. 1 is a diagrammatic representation of a first form of overhead support structure.

Referring to FIG. 1, the overhead support structure comprises two transversely spaced upstanding poles 1 and, extending between and connected to the poles, a lattice girder beam 2. At the lowermost end of each pole 1, the pole is coupled to a foundation fitting 3 in such a way as to permit limited pivotal movement of the pole about a substantially horizontal axis extending substantially normal to the beam 2. At each of its ends the beam 2 is connected to one of the poles 1 in such a way as to permit limited pivotal movement of the beam with respect to the pole about a substantially horizontal axis which is substantially parallel to the pivotal axis at the foot of the pole. Each pole 1 is anchored directly to the ground by a flexible tie 4.

Figure 2:
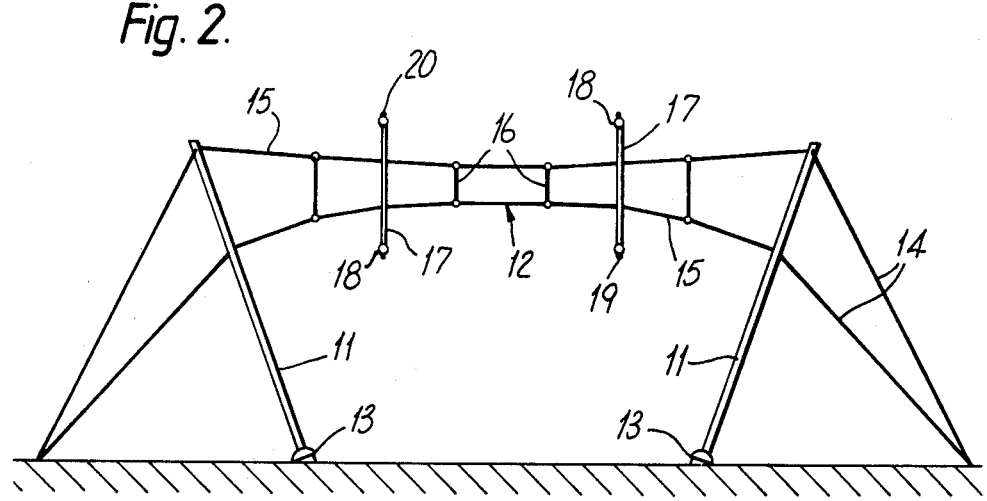
FIG. 2 is a diagrammatic representation of the second form of overhead support structure.
Figure 3:
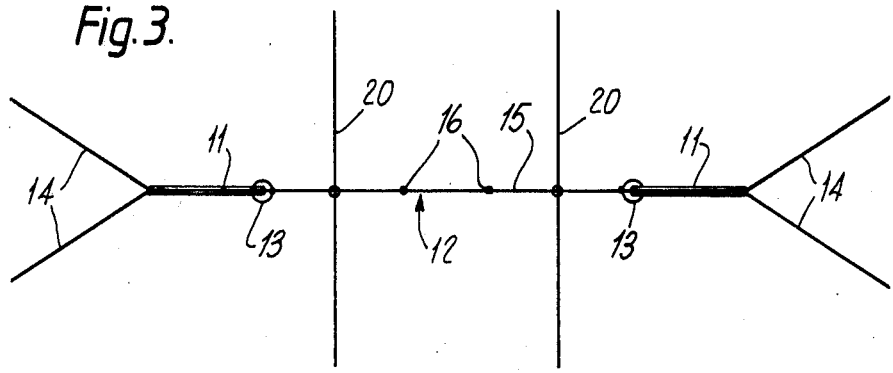
FIG. 3 is a diagrammatic plan view of the second form of overhead support structure shown in FIG. 2.

The overhead support structure shown in FIGS. 2 and 3 comprises two transversely spaced upstanding tubular poles 11 and, extending between and connected to the poles, a tensioned wire beam 12. At the lowermost end of each tubular pole 11, the end of the pole engages over an upstanding boss of substantially hemispherical shape carried by a fitting 13 mounted on the ground so as to permit limited pivotal movement of the pole in any direction. Each tubular pole 11 is anchored direct to the ground by four stay wires 14 uniformly space on opposite sides of the central axis of the tensioned wire beam 12. The tensioned wire beam 12 comprises two flexible steel stranded cables 15, one positioned above and spaced from the other and both so secured to the poles 11 that they are in tension and, securing the cables together, a plurality of vertically disposed flexible steel stranded cables 16 attached to the cables 15 at spaced positions along their lengths and constituting tension elements. Two vertically disposed rigid tubes 17 of resin bonded glass fibre are secured to the cables 15 and protrude downwardly below and upwardly above the cables, each tube having spaced from its ends holes through which the cables pass and in which the cables are clamped by wedges (not shown) driven into the holes. Each tube has, at its lowermost end, a fitting 18 from which a contact wire 19 is suspended and has, at its uppermost end, a fitting 18 which supports a catenary wire 20.

Figure 4:
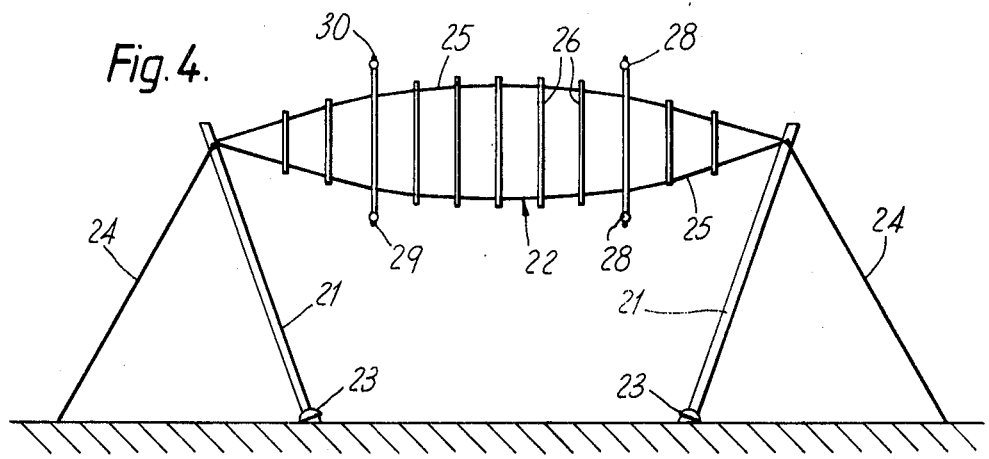
FIG. 4 is a diagrammatic representation of the third form of overhead support structure.
Figure 5:
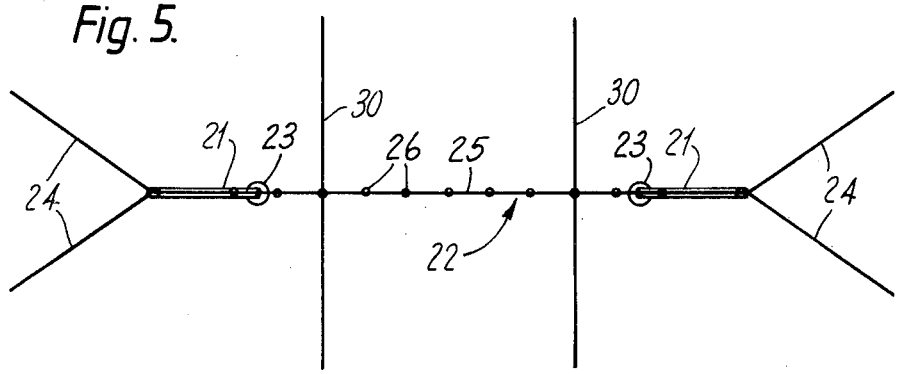
FIG. 5 is a diagrammatic plan view of the third form of overhead support structure shown in FIG. 4.

The overhead support structure shown in FIGS. 4 and 5 comprises two transversely spaced upstanding tubular poles 21 and, extending between and connected to the poles, a tensioned wire beam 22. At the lowermost end of each tubular pole 21, the end of the pole engages over an upstanding boss of substantially hemispherical shape carried by a fitting 23 mounted on the ground so as to permit limited pivotal movement of the pole in any direction. Each tubular pole 21 is anchored direct to the ground by two stay wires 24 uniformly spaced on opposite sides of the central axis of the tensioned wire beam 22. The tensioned wire beam 22 comprises two flexible steel stranded cables 25, one positioned above and spaced from the other and both so secured to the poles 21 that they are in tension and, securing the cables together, a plurality of vertically disposed rigid tubes 26 of resin bonded glass fibre attached to the cables 25 at spaced positions along their lengths and constituting compression members. Each tube 26 has spaced from both of its ends holes through which the cables 25 pass, the tubes being clamped to the cables by wedges (not shown) driven into the holes. Two of the tubes 26 protrude downwardly below and upwardly above the cables 25 and each of these tubes has at its lowermost end a fitting 28 from which a contact wire 29 is suspended; at the uppermost end of each of these tubes is a fitting 28 which supports a catenary wire 30.

What I claim as my invention is:

1. An overhead electric traction system of the kind in which current is collected from an overhead contact wire by means of a collector carried on the roof of a vehicle and extending transversely of the contact wire, which collector, in its operative position, is pressed upwards into contact with the underside of the contact wire and in which, at at least one of a plurality of positions spaced along the route of the system, the contact wire is supported by an overhead structure comprising two transversely spaced upstanding members, and extending between and connected to said upstanding members, a transversely extending beam, wherein each of the upstanding members is so installed near its lowermost end as to permit limited pivotal movement of the member at least about an axis extending lengthwise of the route of the system; each end of the transversely extending beam is so connected to one of the upstanding members near the uppermost end of the member and limited relative movement is permitted between the beam and the upstanding member at least about an axis extending lengthwise of the route of the system; and each upstanding member is anchored to the ground by at least one tie connected to the member near its uppermost end.

2. An overhead electric traction system of the kind in which current is collected from an overhead contact wire by means of a collector carried on the roof of a vehicle and extending transversely of the contact wire, which collector, in its operative position, is pressed upwards into contact with the underside of the contact wire and in which, at at least one of a plurality of positions spaced along the route of the system, the contact wire is supported by an overhead structure comprising two transversely spaced upstanding members, and extending between and connected to said upstanding members, a transversely extending beam, wherein each of the upstanding members is so installed near its lowermost end as to permit limited pivotal movement in any direction; each end of the transversely extending beam is connected to one of the upstanding members near the uppermost end of the member and limited relative movement is permitted between the beam and the upstanding member in any direction; and each upstanding member is anchored to the ground by at least two spaced ties connected to the member near its uppermost end.

3. An overhead electric traction system as claimed in claim 2, wherein pivotal movement in any direction of each upstanding member near its lowermost end is provided by means of a ball and socket coupling at the lowermost end of the member.

4. An overhead electric traction system as claimed in claim 3, wherein the lowermost end of the upstanding member is of substantially hemispherical shape and engages in a recess of substantially hemispherical shape provided in a fitting mounted on the ground.

5. An overhead electric traction system as claimed in claim 3, wherein the lowermost end of the upstanding member has a recess of substantially hemispherical shape which engages over an upstanding boss of substantially hemispherical shape carried by a fitting mounted on the ground.

6. An overhead electric traction system as claimed in claim 1 or 2, wherein each upstanding member is a fabricated structural member.

7. An overhead electric traction system as claimed in claim 1 or 2, wherein each tie is a substantially rigid elongate element.

8. An overhead electric traction system as claimed in claim 1 or 2, wherein each tie is a flexible cable of helically wound flexible elements.

9. An overhead electric traction system as claimed in claim 1 or 2, wherein the transversely extending beam of at least one of the overhead structures is a substantially rigid elongate member.

10. An overhead electric traction system as claimed in claim 1 or 2, wherein the transversely extending beam of at least one of the overhead structures is a tensioned wire beam comprising at least two flexible elongate elements positioned one above and spaced from the other and, securing the flexible elements together, a plurality of substantially vertically disposed elements attached to the flexible elements at spaced positions along their lengths, the flexible elements being so secured to said transversely spaced upstanding members that the flexible elements are in tension.

11. An overhead electric traction system as claimed in claim 10, wherein the substantially vertically disposed elements attached to the transversely extending flexible elements of the overhead structure or of at least one of the overhead structures are all substantially rigid members.

12. An overhead electric traction system as claimed in claim 10, wherein the substantially vertically disposed elements attached to the transversely extending flexible elements of the overhead structure or of at least one of the overhead structures are all substantially flexible tension elements.

13. An overhead electric traction system as claimed in claim 10, wherein the transversely extending beam of the overhead structure or of at least one of the overhead structures is of compound form in which, over an intermediate part of the lengths of the transversely extending flexible elements, the substantially vertically disposed elements are substantially rigid compression members and over end parts of the lengths of the flexible elements, the substantially vertically disposed elements are tension elements.

14. An overhead electric traction system as claimed in claim 10, wherein the substantially vertically disposed elements of the beam of the or each overhead structure are so attached to the transversely extending flexible elongate elements that substantial movement of a vertically disposed element along a flexible elongate element is prevented.

15. An overhead electric traction system as claimed in claim 11 or 13, wherein, at the or each overhead structure, the contact wire is suspended from the lowermost end of a vertically disposed substantially rigid member of electrically insulating material.

16. An overhead electric traction system as claimed in claim 11, 12 or 15, wherein, at the or each overhead structure, a catenary wire is supported on the uppermost end of a vertically disposed substantially rigid member of electrically insulating material.

17. An overhead electric traction system as claimed in claim 15 or 16, wherein the or each vertically disposed member by which a wire is supported protrudes beyond the transversely extending flexible elongate members to which it is attached.

* * * * *